United States Patent [19]

VanAppledorn

[11] 4,068,350
[45] Jan. 17, 1978

[54] ARTICLE CONTOUR FOLLOWER MECHANISM

[75] Inventor: William VanAppledorn, Holland, Mich.

[73] Assignee: Prince Corporation, Holland, Mich.

[21] Appl. No.: 743,585

[22] Filed: Nov. 22, 1976

Related U.S. Application Data

[63] Continuation of Ser. No. 591,852, June 30, 1975, abandoned.

[51] Int. Cl.² ............................................. A22C 17/04
[52] U.S. Cl. ......................................... 17/1 G; 17/46
[58] Field of Search ..................... 17/1 G; 74/63, 710, 74/713

[56] References Cited
U.S. PATENT DOCUMENTS

| | | | |
|---|---|---|---|
| 3,406,592 | 10/1968 | Von Kaler | 74/710 |
| 3,456,284 | 7/1969 | Wiernier et al. | 17/1 G |
| 3,502,302 | 3/1970 | Hamersley | 74/713 |
| 3,522,738 | 8/1970 | Zwiep et al. | 17/32 |

Primary Examiner—Russell R. Kinsey
Assistant Examiner—Paul J. Hirsch
Attorney, Agent, or Firm—Price, Heneveld, Huizenga & Cooper

[57] ABSTRACT

A drive mechanism for causing a plurality of follower members to follow the contour of an elongated article moved axially through an opening formed by the follower members. The follower members are supported for rotation on a pair of rotatably mounted annular members and driven by a common drive. As the angular position or phase of the annular members is changed with respect to each other, the follower members are urged to move toward or away from the axial center to follow the contour of the elongated article. One of the annular members is coupled directly to the common drive while the other is connected to the drive through a differential mechanism by which the phase relationship of one of the members can be varied with respect to the other to thereby position the follower members into contour following engaging relationship with the elongated article.

11 Claims, 10 Drawing Figures

ARTICLE CONTOUR FOLLOWER MECHANISM

CROSS REFERENCE TO RELATED APPLICATION

This is a continuation of application Ser. No. 591852, filed June 30, 1975 now abandoned.

BACKGROUND OF THE INVENTION

In the U.S. Pat. Nos. 3,457,586, T. C. Zweip, et al., issued July 29, 1969; 3,486,187, T. C. Zweip, et al. issued Dec. 30, 1969; and 3,522,738, T. C. Zweip, et al. issued Aug. 4, 1970, various methods and apparatus are disclosed to remove bones from animal meat cuts, such as hams. U.S. Pat. No. 3,457,586 discloses a deboning apparatus wherein the meat cut to be deboned is held by an end of the bone while a rotating plow member is urged against and along the length of the bone to remove the meat.

U.S. Pat. No. 3,522,738 is specifically directed to a mechanism for causing a plurality of rotating follower members to follow the contour of the elongated article as a bone as it is axially moved through or with respect to an axis passing through an opening defined by the rotating annular support members for the following members. As disclosed therein, each of the annular support members are independently driven ad a differential between the speed of one member with respect to the other is adjustably maintained by means of a clutch. The clutch is adjusted such that slippage is permitted at a predetermined torque to cause the members to rotate at the same speed when the follower member engage a bone. The apparatus disclosed in the above-mentioned patent is a significant step forward in the art related to the removal of meat from bones. Because the slip clutch assembly, through periods of use, requires adjustment and oftentimes, complete replacement improvements in the drive mechanisms were considered necessary. Subsequent improvements in the driving mechanism incorporated magnetic particle clutch mechanisms utilized with a torque sensor.

SUMMARY OF THE INVENTION

The present invention provides a driving means for the support members annd follower wherein the force applied to move the follower members to engage the article is controlled without slip clutches, magnetic clutches, torque controllers and the like. The invention includes novel differential gear means for controlling the relative rotation and phase relationship of one of the rotating support members with respect to the other. Means are provided to adjust the angular relationship of the follower members to cause radial movement of the follower members toward and away from the axis of rotation.

More specifically, the article contour follower apparatus of the present invention includes an annular inner and an annular outer member mounted concentrically for rotation about an axis defining an opening through which an elongated article is axially movable. A plurality of follower members are pivotally mounted to the inner and outer members for movement therewith and means is provided for changing the angular of phase relationship of the inner and outer members with respect to each other to cause the follower members to move toward and away from the axial center of the opening. The means for changing the phase relation includes a common drive means for the annular members. One annular member is directly coupled to the drive means while the other is coupled to the drive means through a differential means. The differential means is mounted for movement such that limited rotation of the differential means will shift one of the rotatable annular member with respect to the other to thereby urge the follower member toward and away from the axial center of the opening to follow the contour of the article.

The present invention is particularly adapted for utilization in bone removing mechanisms of the type described in the above mentioned patents, although, as those skilled in the art will readily appreciate, the invention is uniquely adapted for driving and positioning an article contour follower assembly in any of a wide variety of applications. For convenience, the invention will be described herein with reference to and specifically in connection with an article contour follower apparatus for removing bones from animal meat cuts. Reference may, therefore, be had to any of the above-mentioned commonly assigned patents for a more detailed description of the method and apparatus for removing bones from animal meat cuts.

BRIEF DESCRIPTION OF THE DRAWINGS

The invention will now be described with reference to the accompanying drawings in which.

DESCRIPTION OF THE PREFERRED EMBODIMENT

In accordance with a preferred embodiment of the invention, the article contour follower apparatus may be utilized for removing the bone from an animal meat cut as a ham wherein the tibia bone is held such that the meat is suspended from the end of the tibia bone. A stripping cone assembly containing plow or follower members rotates about the bone. The followers are urged against the bone while the stripping cone and bone are moved relative to each other to plow the meat intact away from the bone as the follower members move along the contour of the bone.

Figure 1:
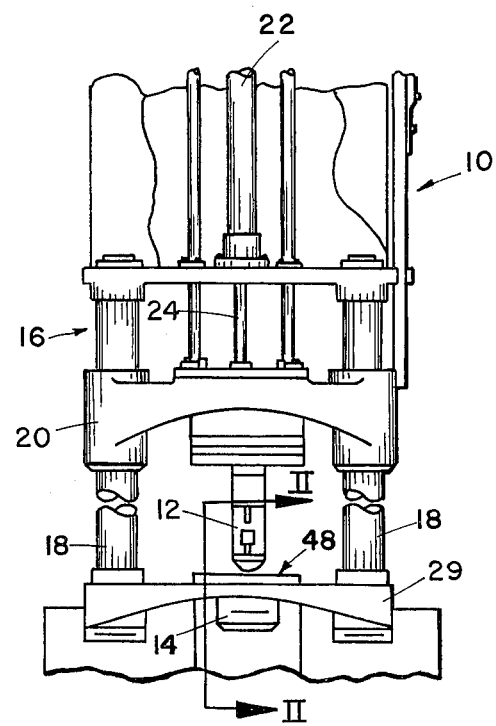
FIG. 1 is a fragmentary front elevational view of a portion of a deboning machine in which the present invention is utilized.

Referring to FIG. 1 of the drawings, a portion of a deboning apparatus 10, as illustrated, is mounted on a deboning machine. A bone holder 12 can be mounted, for example, on the arm of a deboning machine and is adapted to hold one end of the bone. Bone holder 12 may be constructed in accordance with the teachings of commonly assigned U.S. Pat. No. 3,866,271 entitled BONE HOLDING MECHANISM. The bone holder disclosed therein may be mounted, for example, on the arm of a deboning machine of the type disclosed in the above-mentioned U.S. Pat. No. 3,457,586. In that patent, it is noted that the bone and holder remain relatively stationary while the plow member are urged downwardly along the length of the bone. In the preferred embodiment disclosed herein and as illustrated in FIG. 1, the stripping cone or follower assembly 14 is fixed in position and the bone is moved upwardly through the follower to remove the meat therefrom. This is conveniently accomplished by means of a tower assembly 16 which is adapted at its lower extremity for mounting a follower assembly 14 of the type disclosed in the above mentioned patents. A pair of support columns 18 extend upwardly parallel to each other from the follower assembly. Bone holder 12 is mounted for vertical movement between the support columns in a carriage 20. An actuator cylinder 22, having an extendible and retractable rod 24, is connected to the carriage to effect movement of the carriage and the attached bone holder 12 with respect to the follower 14 as described in the above-mentioned patents.

Figure 4:
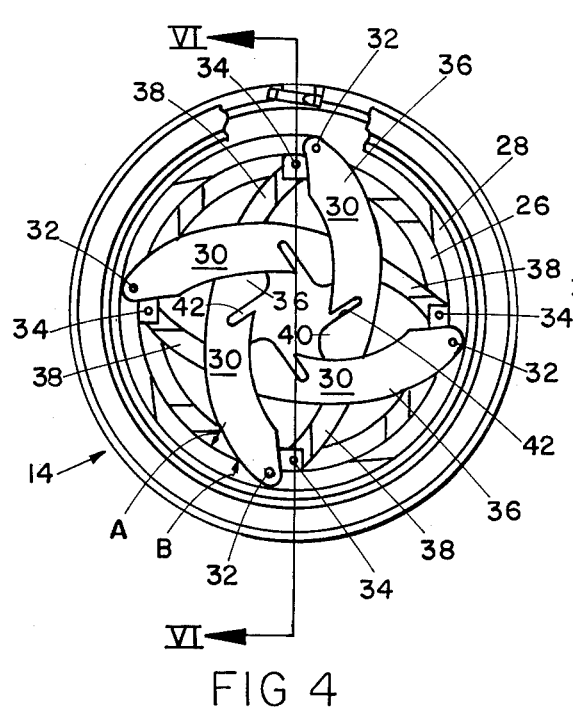
FIG. 4 is a bottom view of the article contour follower assembly as viewed along the plane IV—IV of FIG. 2 illustrating the follower members in a closed position.
Figure 5:
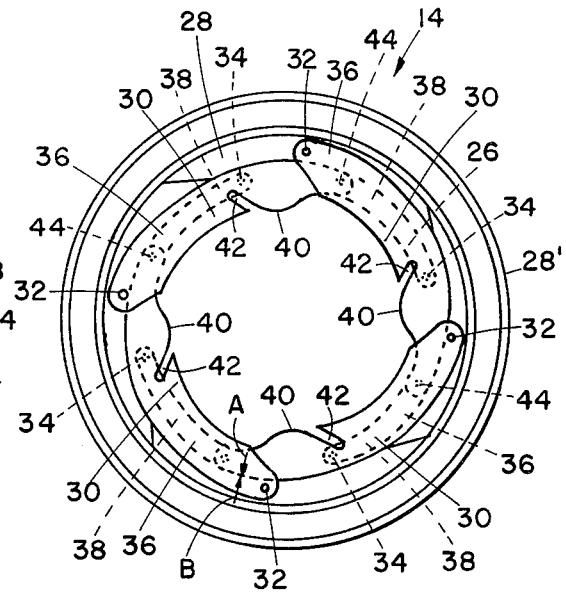
FIG. 5 is a view similar to FIG. 4 showing the follower members in an open position.
Figure 6:
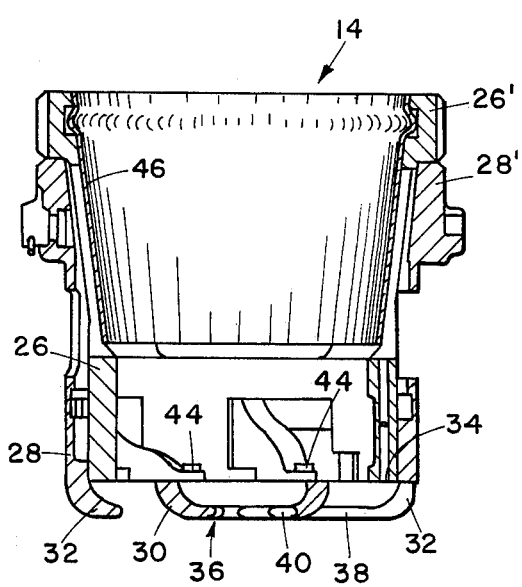
FIG. 6 is a cross-sectional view taken along the plane VI—VI of FIG. 4 illustrating the internal construction of the article contour follower assembly.

Referring briefly to FIGS. 4, 5 and 6, the follower assembly 14 will be described only in sufficient detail necessary for an understanding of its basic operation. For a more detailed description of the operation and construction of the follower assembly, reference may be had to the above-mentioned, commonly assigned U.S. Pat. No. 3,522,738.

Basically, the follower assembly or stripping cone assembly 14 includes an inner or cam follower cone member 26 and an outer or plow cone member 28. Cone members 26 and 28 are mounted concentrically for rotation on a head support assembly 29 carried on tower assembly 16 of the deboning apparatus 10 (FIG. 1). A plurality of follower members or plow blades 30 are pivotally mounted at one end 32 to outer cone member 28. The opposite ends 34 of followers 30 are similarly pivotally mounted to the inner or follower cone member 26. The body of followers 30 are formed of two hinged together sections. A meat removing section 36 has an edge portion 40 and a slot 42 for plowing the meat from the bone and removing the meat tendons. A linking section 38 is pivotally attached to the meat removing section 36 by means of a pin 44 (FIG. 6). The opposite end of linking section 38 forms the end 34 of the follower which is attached to the inner or follower cone member 26. A conically shaped insert 46 (FIG. 6) is positioned within the inner core member 26 to prevent particles of meat from entering between the concentrically mounted inner and outer cone members.

As illustrated in FIG. 6, the upper end 26' of the inner cone and the upper end 28' of the outer cone member are adapted for mounting in a mounting assembly 48 (FIGS. 2 and 3) which includes a pair of pulley wheels 50 and 52. Pulley wheels 50 and 52 are drivingly connected to the inner and outer members to independently rotate the inner cone member 26 and the outer cone member 28, respectively, in a manner as described in the above-mentioned U.S. Pat. No. 3,522,738.

Referring now to FIGS. 2, 3 and 7-9, the driving mechanism for the follower assembly 14 will be described in greater detail. The follower drive assembly is carried by the head mounting assembly generally indicated by the numeral 48 and provides the mounting mechanism for the previously mentioned drive pulleys 50 and 52 and follower assembly 14. The head mounting assembly 48 also carries the drive mechanisms including an electric motor 54, a differential or phase shifting means 56 which is contained in a separate differential sub-assembly 58 as will be described in greater detail hereinafter in connection with FIGS. 7-9.

Figure 2:
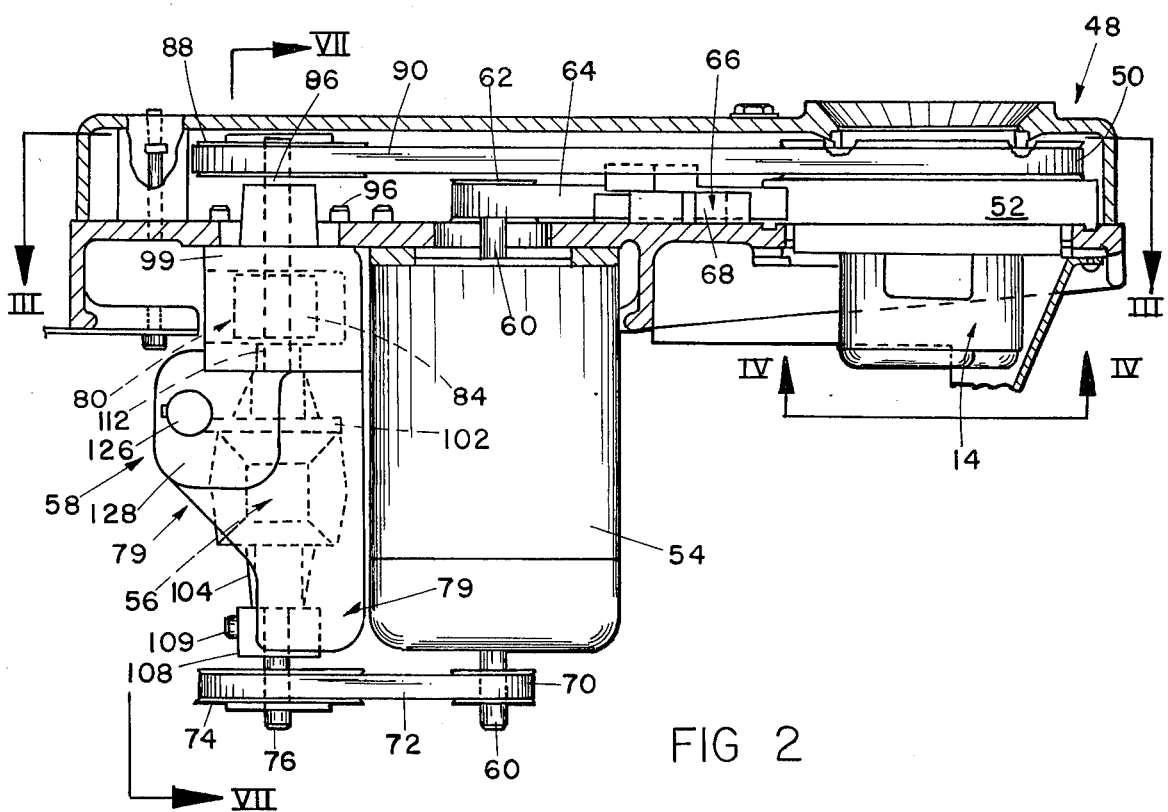
FIG. 2 is a fragmentary cross-sectional view taken along the plane 11—II of FIG. 1 illustrating the drive mechanisms for the article contour follower mechanism.
Figure 3:
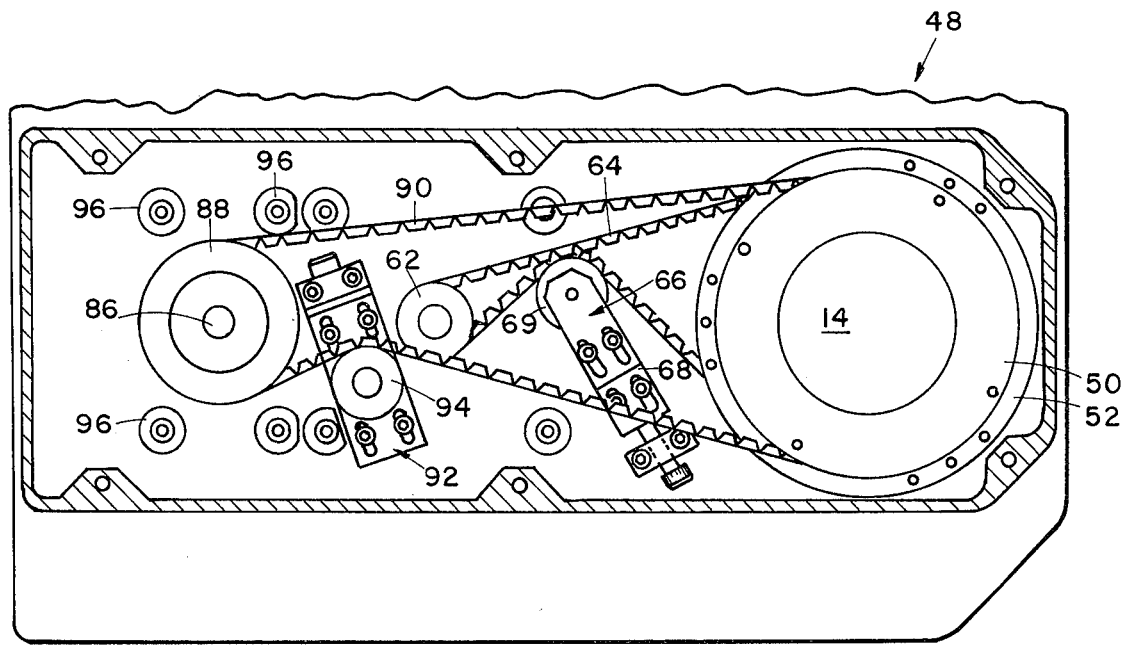
FIG. 3 is a cross-sectional view taken along the plane III—III of FIG. 2.

Driving means 54 is an electric motor of conventional construction having a rotatably shaft 60 extending axially therethrough. The upper end of shaft 60 extends through head assembly 48 and is equipped with a pulley wheel 62 (FIGS. 2 and 3). Pulley wheel 62 is, in turn, drivingly connected by means of a belt 64 to drive pulley 52 connected to rotate outer cone member 28. A belt tightener or tensioner assembly 66 is positioned intermediate pulley 62 and drive pulley 52 to adjustably maintain the tension on belt 64. Tensioner 66 is of conventional design and includes a mounting 68 adjustably secured to heat mounting assembly 48. Mounting 68 carries an idler wheel 69 which engages the belt 64 to maintain tension on the belt.

It should be noted that belt 64 and pulleys 62 and 52 form a positive drive assembly, that is, both the pulley wheels and the belt are equipped with teeth in the manner of meshing gears. As will be more fully explained hereinafter, it is preferred to use a positive drive or timing belt arrangement between the drive means 54 and pulleys and through the phase shifter or differential 56 to maintain the proper phase relationship between the inner and outer cone members 26 and 28 as they rotate.

The opposite end of shaft 60 extends downwardly through motor 54 and is similarly equipped with a positive drive pulley 70 which is connected to a positive drive belt 72 to drive a similar positive drive pulley wheel 74 fixed to the input shaft 76 of differential 56.

Figure 9:
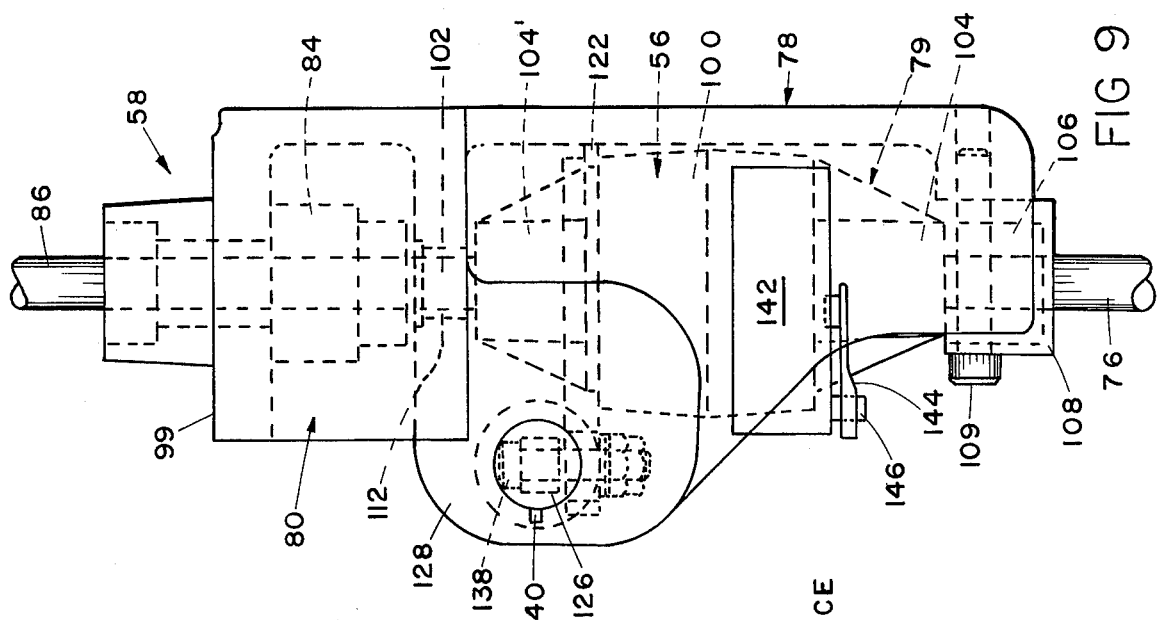
FIG. 9 is a side elevational view of the assembly shown in FIGS. 7 and 8.
Figure 7:
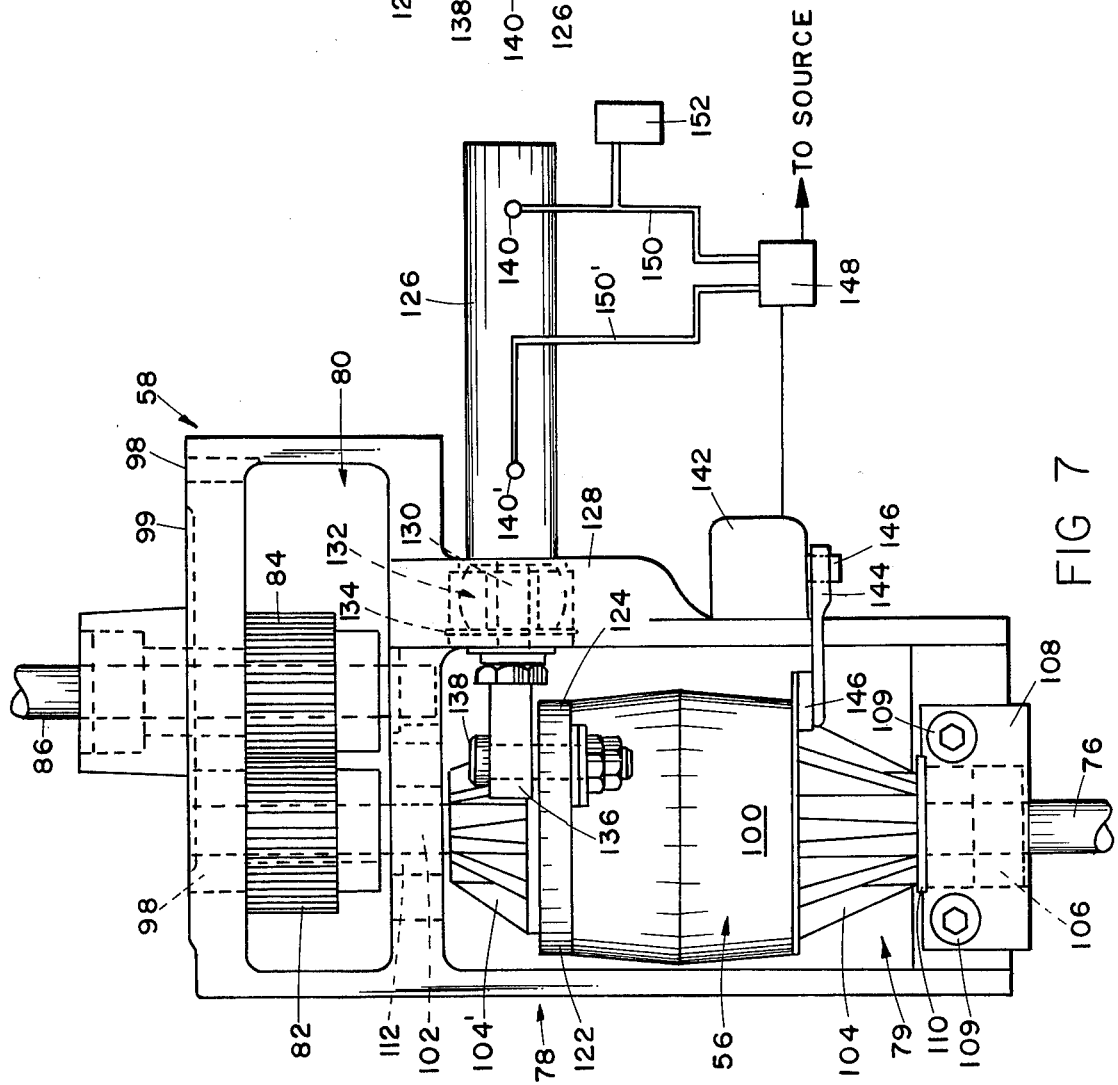
FIG. 7 is a cross-sectional view taken along the plane VII—VII of FIG. 2 illustrating the differential mechanism for shifting the angular position or phase of the article contour follower to move the followers between open and closed positions.
Figure 8:
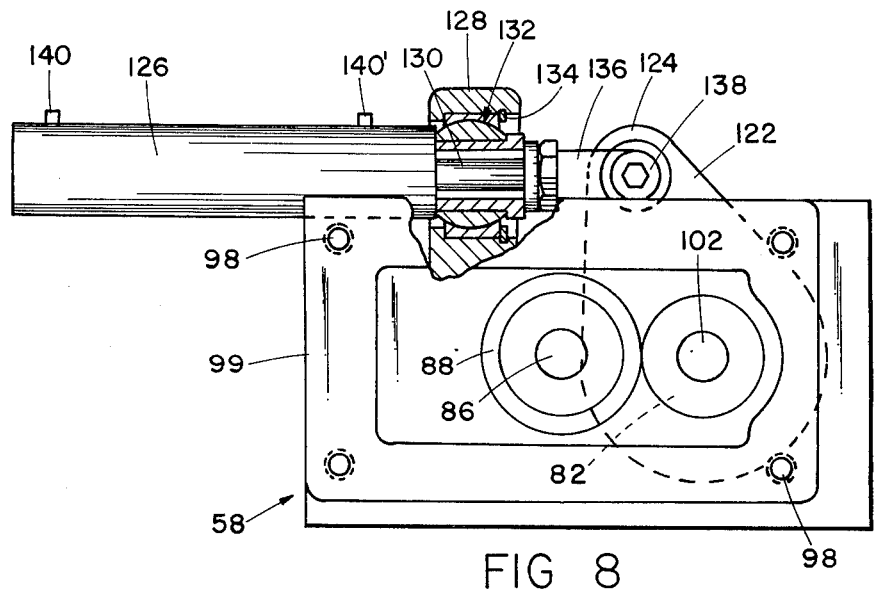
FIG. 8 is a top plan view of the assembly shown in FIG. 7.
Figure 10:
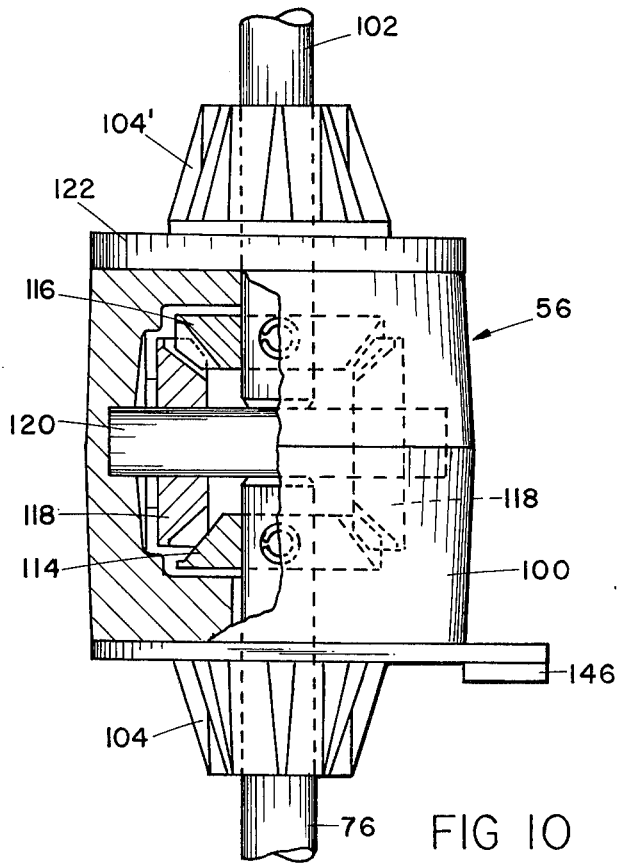
FIG. 10 is a fragmentary elevational view of the differential.

Referring to FIGS. 7-9, differential sub-assembly 58 includes a frame 78 having a lower portion 79 in which differential 56 is adjustably mounted and an upper portion 80 containing a pair of gears 82 and 84 adapted to rotate a secondary output shaft 86. Secondary shaft 86 is also equipped with a positive drive pulley 88 (FIGS. 2 and 3) and is connected by a positive drive belt 90 to the previously mentioned pulley 50 to drive the inner cone member 26. A tensioner 92 similar in construction to tensioner 66, described above, adjustably carries an idler wheel 94 to maintain the proper tension on timing belt 90. Differential sub-assembly 58 is secured to head assembly 48 (FIG. 2) by means of mounting screws 96 extending through the head assembly and into tapped openings 98 formed in the top wall 99 of sub-assembly 58.

Differential 56 is of commercially available construction and is of the type as disclosed, for example, in U.S. Pat. No. 3,406,592. Differentials of this type are available from the Assignee of the above-mentioned patent, Tecumseh Products Company, Tecumseh, Mich., Model No. 142. Such differential mechanisms are conventionally used as a differential for the rear axle of small vehicles as garden tractors or the like. In these applications, the housing is typically rotatably mounted and connected to the drive means to transmit engine torque to the drive wheels of the vehicle. In the present invention, a differential mechanism of the aforementioned type is mounted for limited rotational movement in differential sub-assembly 58, as will be hereinafter described.

Referring to FIG. 7, differential 56 is mounted in frame 78 of sub-assembly 58 at the lower portion 79 for limited rotational movement. Differential 56 includes a cover housing 100 having a pair of co-axial shafts journaled for rotation with respect to the housing including the previously mentioned input shaft 76 and an output shaft 102. Differential housing 100 includes a pair of oppositely directed flange portions 104 and 104' through which the input and output shafts are journaled on bearings (not shown). Input shaft 76 extending through lower flange 104 is additionally mounted for rotation in a bearing 106 held in place by a bearing block 108 and secured to frame 78 by screws 109. A lower support washer 110 is positioned between the top surface of bearing block 108 and the end of flange 104. Output shaft 102 extends outwardly from upper flange portion 104' and is mounted for rotation in frame 78 by a sleeve bearing 112.

Input shaft 76 extends into housing 100 of the differential and carries a bevel gear 114. Output shaft 102 is similarly equipped with a bevel gear 116. A pair of pinion bevel gears 118 are freely rotatable on a pin 120 and mesh with gears 114 and 116. Pin 60 is fixed with respect to the housing 100 for movement therewith.

A plate member 122 is fixed to the upper portion of differential 56 and includes an outwardly extending arm 124. An air cylinder 126 is fixed to an outwardly extending wall flange 128 formed on a side wall of frame 78. Cylinder 126 is conventional and includes an extendible and retractably piston rod 130. The cylinder is fixed in wall flange 128 in a conventional manner by means of a spherical bearing and nut assembly 132 and retaining ring 134. A pivot link 136, fixed to the end of piston rod 130, is pivotally connected by means of a shoulder screw 138 to extending arm 124 of plate member 122. Cylinder 126 is adapted by means of inlet fittings 140 and 140' for connection to a source of fluid pressure (not shown). As piston rod 130 is extended and retracted differential 58 is rotated about the axis of input shaft 76 and output shaft 102 in bearings 106 and 112 (FIG. 7).

A limit switch 142 positioned on a side wall of frame 78 is responsive to movement of the differential housing in one direction to sense the phase relationship between input shaft 76 and output shaft 102 which is indicitive of the position of the follower members 30 with respect to the axial center of the follower assembly 14. Limit switch 142 is actuated by means of lever arm 144 connected to switch 142 and is operated by an actuator member 146 secured to the lower portion of differential 56. As differential 56 is rotated by cylinder 126 into the position as shown in FIG. 7, actuator 146 contacts lever arm 144 to operate limit switch 142. Limit switch 142 is in turn connected to suitable control circuits 148 which are included to control operation of the entire apparatus including cylinder 126 to insure that the follower members 30 assume the position shown in FIG. 5 prior to operation to thereby prevent damage as, for example if bone holder 12 and follower assembly 14 should be moved relative to each other.

Limit switch 142 senses the position of followers 30 (FIG. 5) by detecting the position of differential 58. Control circuit 148 is connected between a source of fluid pressure and operates to allow introduction of such fluid pressure through lines 150 to inlet 140 of cylinder 126 and also through lines 150' to inlet 140' of the cylinder. An expansion chamber 152 is also provided in the fluid pressure line 150 which controls the extension of piston rod 130 and the resultant rotation of differential 56 to close followers 30 toward the axial center of the follower assembly 14.

OPERATION

During operation, an elongated object as a ham having a bone therein is attached to bone holder 12 (FIG. 1) and the holder with the bone attached is moved relative to follower assembly 14. Follower assembly 14 is originally positioned as shown in FIG. 5 and is set into motion by operation of motor 54. Motor 54 rotates pulley 52 via pulley 62 and belt 64 to rotate outer cone 28. The inner cone is simultaneously driven through the phase shifter or differential mechanism 58 via the belts and pulleys previously described. When originally set into motion, inner member 26 and the outer member 28 operate together and rotate at the same speed and in phase with one aother to maintain the follower 30 in the open position shown in FIG. 5. For purposes of illustration, arrows A nd B on FIG. 5 shown on the inner members and outer members, respectively, to show the alignment of the inner and outer rotatable members with respect to each other.

During meat stripping operations, as the bone is moved relative to the follower assembly and as the inner and outer members are rotated, the source of fluid pressure is applied through line 150 and inlet 140 of cylinder 126 causing differential 56 to turn slightly about the axis of shafts 76 and 102. As differential 56 is turned, the rotational speed of input shaft 76 driven by motor 54 remains constant. The change in position of the pinion bevel gears 118 which, as it will be recalled, are fixed with respect to housing 100 of differential 56 also rotate. Since gears 118 are in mesh with both pinion 114 on input shaft 76 and also mesh with pinion gear 116 on output shaft 102, shaft 102 momentarily increases its speed and its angular position relationship with respect to input shaft 76 is advanced. The change in position of the output shaft with respect to the input shaft in turn operates through gears 82 and 84 to effect a corresponding advance of secondary output shaft 86. As a result, the inner member 26 is advanced with respect to the outer member 28 causing followers 30 to move toward a closed position to follow the contour of an article as a bone contained therein. The closed position is illustrated in FIG. 4 wherein it will be noted that the index arrows A and B of FIG. 5 when compared to those shown in FIG. 5 illustrate the change in the angular or phase relationship between the inner and outer members.

Cylinder 126 is energized during meat stripping operations to exert a constant advancing force on differential 56 causing followers 30 to follow the contour of the bone as relative movement and rotation occur between the follower assembly and the bone. As the contour of the bone changes, followers 30 close and open to maintain constant engagement with the bone. Cylinder 126 operates as a biasing force to advance the inner member with respect to the outer member. As the contour of the bone changes and the followers move toward an open position, expansion chamber 155 connected in the fluid pressure line 150 for cylinder 126 allows the differential to shift as required. During operation, differential 54 constantly shifts about its axis changing the phase relationship of the inner and outer members with respect to each other.

The action of the follower members 30 tends to center the bone within the annular space provided between them. Accordingly, the bone or other article will automatically tend to center itself during contour following operations. When the operation is completed, sensing mechanisms (not shown) shift the source of fluid pressure from line 150 to line 150' and inlet 140' of cylinder 126 to cause piston rod 130 to retract. As a result, differential 56 is again rotated to its original position and the inner and outer cone members return to the relative positions shown in FIG. 5 opening the followers.

Although the apparatus of the present invention has been described in connection with a mechanism for removing a bone from animal meat cuts, the driving and control mechanisms for the article contour follower may be utilized with equal facility to control the contour of an article as in a machining operation. In such applications, the cylinder is programmed to operate in a predetermined sequence to rotate the differential as required to cause the followers to move in and out in a preprogramed manner. Sharpened blade members or other cutting elements can be positioned on the follower members in such applications.

Those skilled in the art will readily appreciate that other phase shifting arrangements can be employed to control an article contour follower mechanism. It is, therefore, intended that such other modifications and variations be included within the scope of the invention unless the following claims state otherwise.

The embodiments of the invention in which an exclusive property or privilege is claimed are defined as follows.

1. An article contour follower apparatus including an annular inner member and annular outer member supported for rotation about an axis in the same rotational direction and defining an opening through which an elongated article is axially movable, at least one follower member pivotally mounted to said inner annular member and said outer annular member for movement therewith, and means for shifting the relationship of said annular members with respect to each other to cause said follower member to move toward and away from the axial center of said opening to follow the contour of an elongated article moved axially through said opening, said shifting means including: a drive means including a common drive for driving said inner and said outer annular members in the same rotational direction, said drive means also including a first drive and a second drive; said first drive being directly coupled to said common drive and to one of said annular members; said second drive being coupled to a third drive for rotating said other of said annular members; control means coupled between said second drive and said third drive; means mounting said control means for rotational movement relative to said second drive and said third drive whereby rotation of said control means will shift the relative rotational positions of said second and third drives causing said other annular member to rotatably shift relative to said one annular member to thereby urge said follower member to open and close toward said axial center of said opening to thereby follow the contour of an elongated article moved therethrough.

2. The article contour follower apparatus of claim 1 and further including biasing means connected to said control means to shift said control means and said other of said annular members with respect to said one annular members to thereby shift said follower member to follow the contour of an article moved axially through said opening.

3. The article contour follower apparatus of claim 1 wherein said control means comprises: a rotatable input member operatively connected to said common drive means; a rotatable output member operatively connected to said other of said annular members; and means connecting said input member to rotate said output member, said connecting means including means for momentarily increasing and decreasing the relative rotational speed of said output member with respect to said input member to change the relative rotational speed between said inner and said outer annular members to thereby urge said follower member toward and away from said axial opening.

4. An article contour follower apparatus comprising:
first and second members mounted concentrically for rotation in a support in the same rotational direction;
a plurality of followers pivotally mounted to said first and said second members for movement therewith, said first and said second members defining an axial opening through which an elongated object is movable, said followers being responsive to changes in the phase relationship between said first and said second members to open and close toward and away from said axial opening, said followers being adapted to contact and follow the contour of an elongated object passing through said axial opening;
a drive means including a common drive for rotating said first and said second members in the same rotational direction, said drive means also incuding a first drive and a second drive, said first drive directly coupled to said common drive to rotate one of said first and second members, said second drive being coupled to a third drive for rotating said other member;
phase shifting means connected between said second drive and said third drive, said common drive being coupled to said second drive to rotate said other of said first and second members through said phase shifting means, said phase shifting means being adapted to momentarily change the relative rotational speed of said other of said first and second members to thereby change the phase relationship between said first and said second members urging said followers to open and close said opening.

5. The apparatus of claim 4 wherein said phase shifting means comprises: differential control means positioned between said second drive and third drive, said differential means including an input shaft connected to said second drive, an output shaft connected to said third drive, and gear means connecting said input shaft to said output shaft, said gear means being adapted to advance and retard said output shaft and third drive with respect to said input shaft and second drive to thereby change the angular relationship of said first and said second members.

6. The apparatus of claim 5 and further including means mounting said gear means for movement with respect to said second and third drives; and means for biasing said mounting means to advance said third drive to thereby move said followers into contour following position.

7. The apparatus of claim 6 wherein said biasing means comprises actuator means adapted for connection to a source of fluid pressure.

8. Apparatus for controlling contour follower members pivotally mounted between a pair of rotatable members mounted for rotation about a common axis in the same rotational direction defining an opening through which an elongated article is axially movable, said follower members being shiftable toward and away from the axial center of said opening with changes in the position of said rotatable members with respect to each other, said control apparatus comprising: drive means for rotating said rotatable members in the same rotational direction, a first drive directly connecting said drive means to one of said members to rotate the same; a second drive and third drive connected to said drive means for rotating the other of said members; differential means connected between said second drive and third drive and thereby between the other of said rotatable members and said drive means, said differential means including an input means connected to said second drive and an output means connected to said other rotatable member through said third drive to rotate said other rotatable member, and shifting means associated with said differential means for changing the rotational relationship of said output means and third drive with respect to said input means and second drive to advance and retard the rotational relationship of said other rotatable member with respect to said one of said members to thereby shift said follower members toward and away from said axial center.

9. The controller apparatus of claim 8 wherein said differential means comprises a housing having an input shaft connected to said second drive, an output shaft drivingly connected to said other rotatable member through said third drive, and gear means supported in said housing connecting said input shaft to said output shaft, said shifting means including said housing being mounted for limited angular rotation with respect to said input shaft whereby movement of said housing advances and retards movement of said output shaft with respect to said input shaft.

10. The controller apparatus of claim 9 and further including biasing means for rotating said housing in a first direction to advance said output shaft with respect to said input shaft to thereby urge said followers toward the axial center of said opening.

11. The controller apparatus of claim 10 wherein said biasing means comprises actuator means adapted for connection to a source of fluid pressure.

* * * * *